US009750171B2

(12) United States Patent
Sudbrink et al.

(10) Patent No.: US 9,750,171 B2
(45) Date of Patent: *Sep. 5, 2017

(54) TILLAGE IMPLEMENT WITH FOLDABLE SHANK FRAME

(71) Applicant: CNH Industrial America LLC, New Holland, PA (US)

(72) Inventors: Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 206 days.

This patent is subject to a terminal disclaimer.

(21) Appl. No.: 14/547,851

(22) Filed: Nov. 19, 2014

(65) Prior Publication Data

US 2015/0156959 A1 Jun. 11, 2015

Related U.S. Application Data

(60) Provisional application No. 61/914,502, filed on Dec. 11, 2013.

(51) Int. Cl.
*A01B 73/06* (2006.01)
*A01B 29/04* (2006.01)
*A01B 73/04* (2006.01)

(52) U.S. Cl.
CPC .......... *A01B 29/048* (2013.01); *A01B 73/044* (2013.01); *A01B 73/065* (2013.01)

(58) Field of Classification Search
CPC ................... A01B 73/00; A01B 73/02–73/067

USPC ....... 172/452, 456, 311, 453, 459, 479, 482, 172/483, 484
See application file for complete search history.

(56) References Cited

U.S. PATENT DOCUMENTS

| 2,828,680 | A | | 4/1958 | Johnson | |
|---|---|---|---|---|---|
| 3,588,139 | A | | 6/1971 | Bayne | |
| 4,237,985 | A | * | 12/1980 | Hoefkes | A01B 63/32 172/460 |
| 4,320,805 | A | | 3/1982 | Winter | |
| 4,331,206 | A | * | 5/1982 | Linton | A01B 59/048 172/311 |
| 4,418,762 | A | * | 12/1983 | Page | A01B 73/02 172/311 |
| 6,263,977 | B1 | | 7/2001 | Mayerle et al. | |
| 6,269,887 | B1 | | 8/2001 | Friggstad | |
| 6,374,923 | B1 | | 4/2002 | Friggstad | |
| 6,550,543 | B1 | | 4/2003 | Friggstad | |
| 7,581,597 | B2 | * | 9/2009 | Neudorf | A01B 73/067 172/1 |
| 7,926,247 | B2 | | 4/2011 | Van Den Engel | |
| 8,118,110 | B2 | | 2/2012 | Tamm et al. | |
| 8,209,946 | B2 | * | 7/2012 | Neudorf | A01D 34/661 172/240 |

(Continued)

*Primary Examiner* — Matthew D Troutman
(74) *Attorney, Agent, or Firm* — Rebecca L. Henkel; Rickard K. DeMille

(57) ABSTRACT

An agricultural tillage implement includes a main frame section having a pull hitch tube extending in a travel direction, and a tool bar coupled with and extending transverse to the pull hitch tube. A shank frame is pivotally coupled with the tool bar. The shank frame is positioned in front of the tool bar when in an operating position, and foldable up and over the tool bar to a position rearward of the tool bar when in a transport position.

9 Claims, 6 Drawing Sheets

(56) References Cited

U.S. PATENT DOCUMENTS 8,342,256 B2 1/2013 Adams et al.
2011/0315411 A1* 12/2011 Adams .................. A01B 73/02
  172/311
2014/0034342 A1* 2/2014 Friggstad ............. A01B 73/067
  172/663
2014/0069670 A1* 3/2014 Friesen ................. A01B 73/02
  172/311

* cited by examiner

TILLAGE IMPLEMENT WITH FOLDABLE SHANK FRAME

CROSS REFERENCE TO RELATED APPLICATIONS

This is a non-provisional application based upon U.S. provisional patent application Ser. No. 61/914,502, entitled "TILLAGE IMPLEMENT WITH FOLDABLE SHANK FRAME", filed Dec. 11, 2013, which is incorporated herein by reference.

BACKGROUND OF THE INVENTION

1. Field of the Invention

The present invention relates to agricultural tillage implements, and, more particularly, to agricultural field cultivators.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

A field cultivator as described above may also include an optional rear auxiliary implement for finishing the seedbed for seeding. For example, a rear auxiliary implement may include a spike tooth harrow, spring tooth harrow, rolling (aka. crumbler) basket, etc., or any combination thereof.

As tillage implements become wider and wider over time, it becomes more difficult to keep the transport size of the implement within manageable limits. It also becomes more difficult to convert the tillage implement from an operating mode to a transport mode, or vice versa, without requiring too much time and difficulty on the part of the operator. It is desirable for the tillage implement to be converted from one mode to the other while the operator remains within the operator cab, through the use of hydraulics or other actuators. It is also desirable for the tillage implement to remain within certain geometric constraints so that it is not necessary to use a separate "escort vehicle" or the like when traveling on public roads.

SUMMARY OF THE INVENTION

The present invention provides a tillage implement with a shank frame which folds from an operating position in front of the tool bar, to a transport position behind the tool bar, thereby allowing additional room for the wing sections to be folded to a compact transport position over the main frame section.

The invention in one form is directed to an agricultural tillage implement, including a main frame section having a pull hitch tube extending in a travel direction, and a tool bar coupled with and extending transverse to the pull hitch tube. A shank frame is pivotally coupled with the tool bar. The shank frame is positioned in front of the tool bar when in an operating position, and foldable up and over the tool bar to a position rearward of the tool bar when in a transport position.

The invention in another form is directed to a shank frame for an agricultural field cultivator including a main frame section having a pull hitch tube extending in a travel direction, and a tool bar coupled with and extending transverse to the pull hitch tube. The shank frame includes a plurality of longitudinal frame members configured for pivotal coupling with the tool bar at one end thereof, whereby the shank frame is positionable in front of the tool bar when in an operating position, and foldable up and over the tool bar to a position rearward of the tool bar when in a transport position. A plurality of cross frame members are coupled with the longitudinal frame members, with each of the cross frame members having a pair of opposite outboard ends which extend past the longitudinal frame members in a generally downward direction. A pair of shank sub-frames are respectively coupled to the opposite outboard ends of the cross frame members. Each shank sub-frame is connected with a plurality of cultivator shanks. The shank sub-frames are spaced apart from each other in a direction transverse to the travel direction.

The invention in yet another form is directed to a method of folding a multi-section field cultivator from an operating position to a transport position. The field cultivator includes a main frame section having a pull hitch tube extending in a travel direction and a tool bar coupled with and extending transverse to the pull hitch tube, and a pair of wing sections respectively positioned adjacent to opposite sides of the main frame section. The method includes the steps of: providing a shank frame which is pivotally coupled with the tool bar and positioned in front of the tool bar when in an operating position; folding the shank frame up and over the tool bar to a position rearward of the tool bar; and folding the pair of wing sections laterally inward to a position above the main frame section.

An advantage of the present invention is that the center section of the field cultivator can be entirely cleared out so that the wing sections can be folded over to a compact folded state for road transport.

Another advantage is that the operating depth of the shank frame can be easily set using gauge wheel assemblies at the front of the shank frame.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
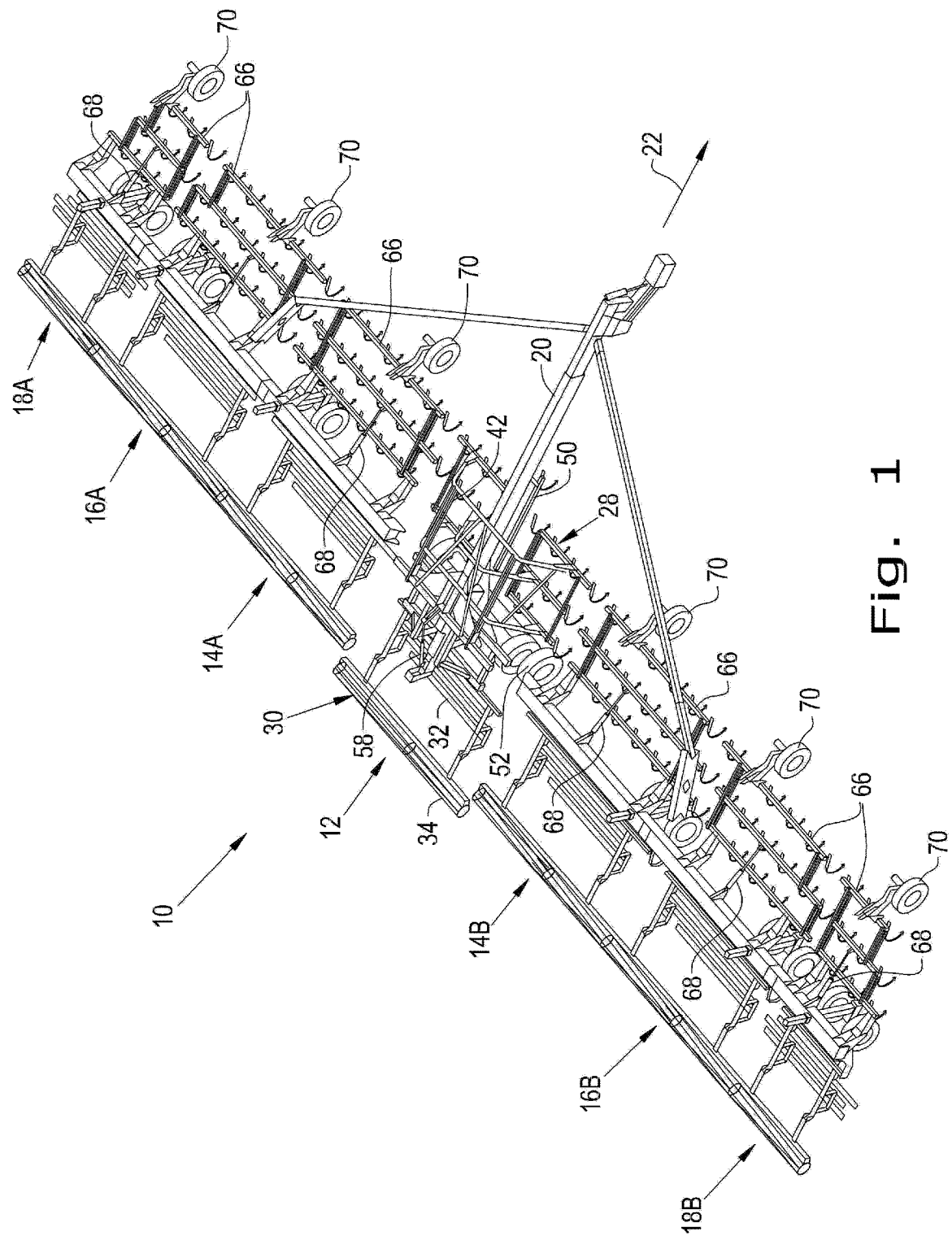
FIG. 1 is a top perspective view of an embodiment of an agricultural tillage implement of the present invention, in the form of a field cultivator.

Referring now to the drawings, and more particularly to FIG. 1, there is shown an embodiment of a tillage implement of the present invention. In the illustrated embodiment, the tillage implement is in the form of a field cultivator 10 for tilling and finishing soil prior to seeding.

Field cultivator 10 is configured as a multi-section field cultivator, and includes a main frame section 12 and a plurality of wing sections 14, 16 and 18. The left wings sections are designated 14A, 16A and 18A, and the right wing sections are designated 14B, 16B and 18B. Wing sections 14A and 14B are each inner wing sections, wing sections 16A and 16B are each middle wing sections, and wing sections 18A and 18B are each outer wing sections.

Figure 2:
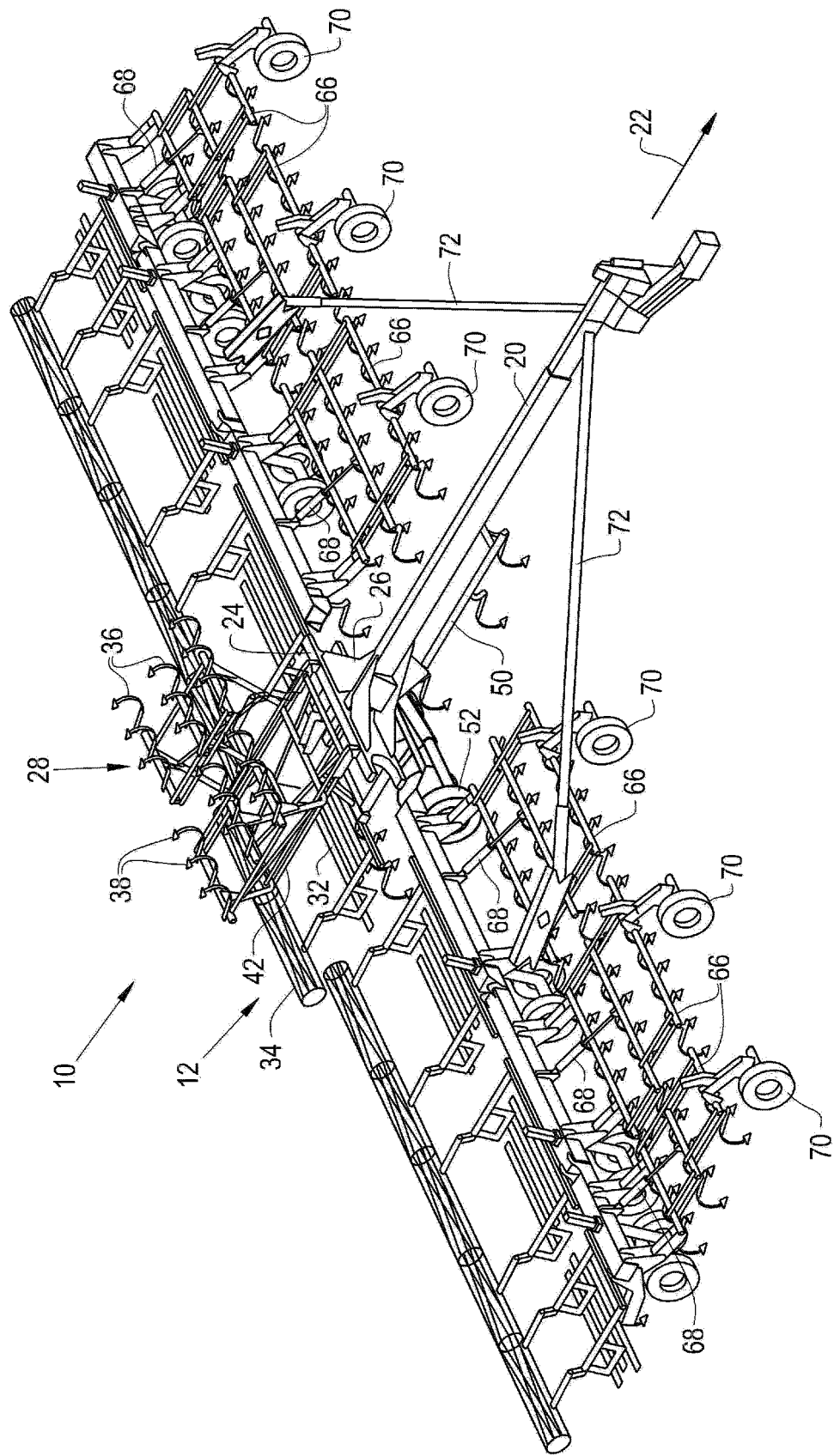
FIG. 2 is the same top perspective view shown in FIG. 1, with the center shank frame folded to a transport position.
Figure 3:
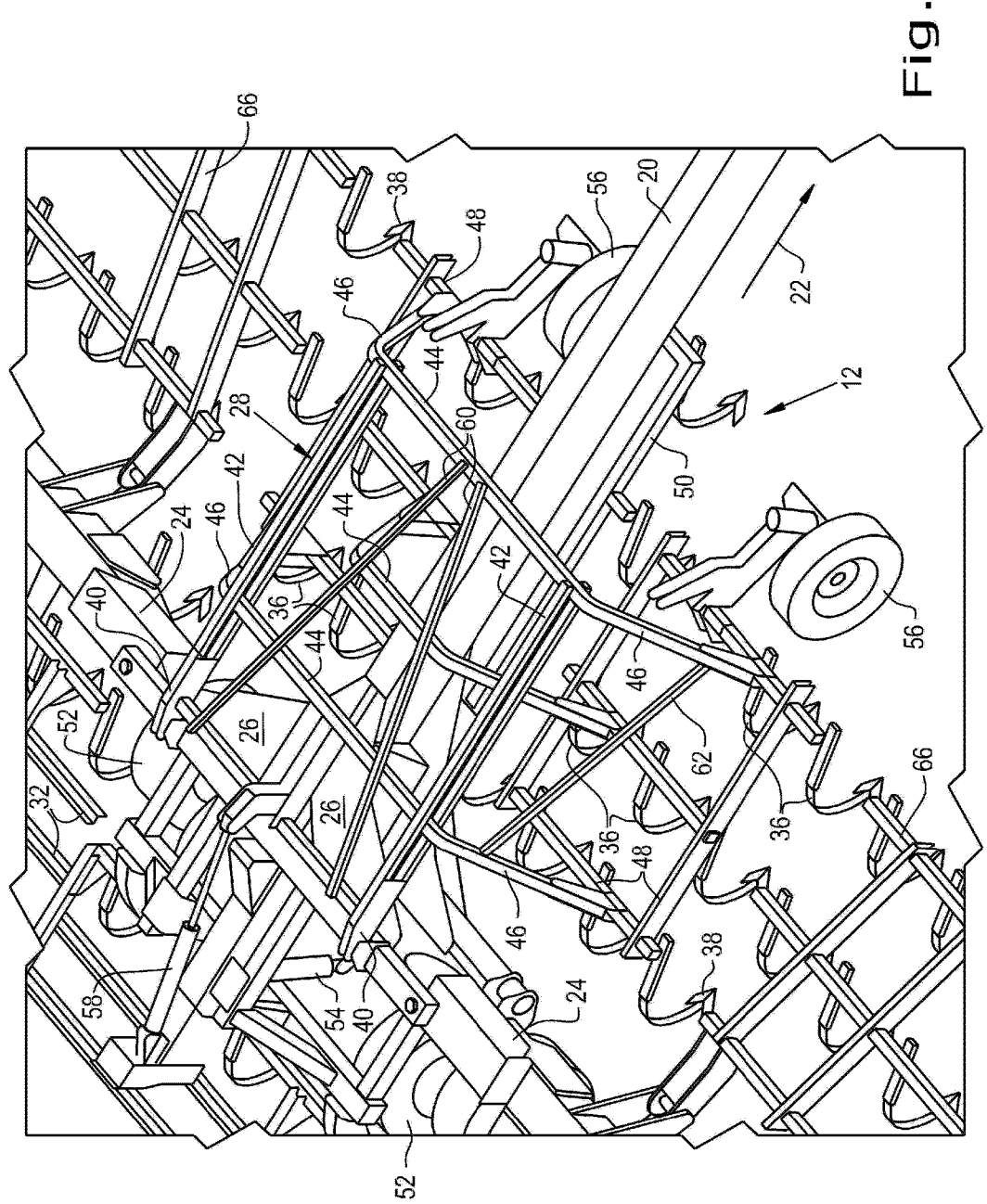
FIG. 3 is a top perspective view of the center frame section with the center shank frame in the operating position.

Main frame section 12 is the center section that is directly towed by a traction unit, such as an agricultural tractor (not shown). Main frame section 12 includes a pull hitch tube 20 extending in a travel direction 22, and a tool bar 24 which is coupled with and extends transverse to pull hitch tube 20 (FIGS. 2 and 3). Reinforcing gusset plates 26 may be used to strengthen the connection between pull hitch tube 20 and tool bar 24. Main frame section 12 generally functions to carry a shank frame 28 for tilling the soil, and a rear auxiliary implement 30 for finishing the soil. Rear auxiliary implement 30 includes a spring tooth drag 32 and a rolling (aka, crumbler) basket 34 which coact with each other to finish the soil. However, rear auxiliary implement can be differently configured, such as a spike tooth drag, cultivator shanks, etc.

Figure 4:
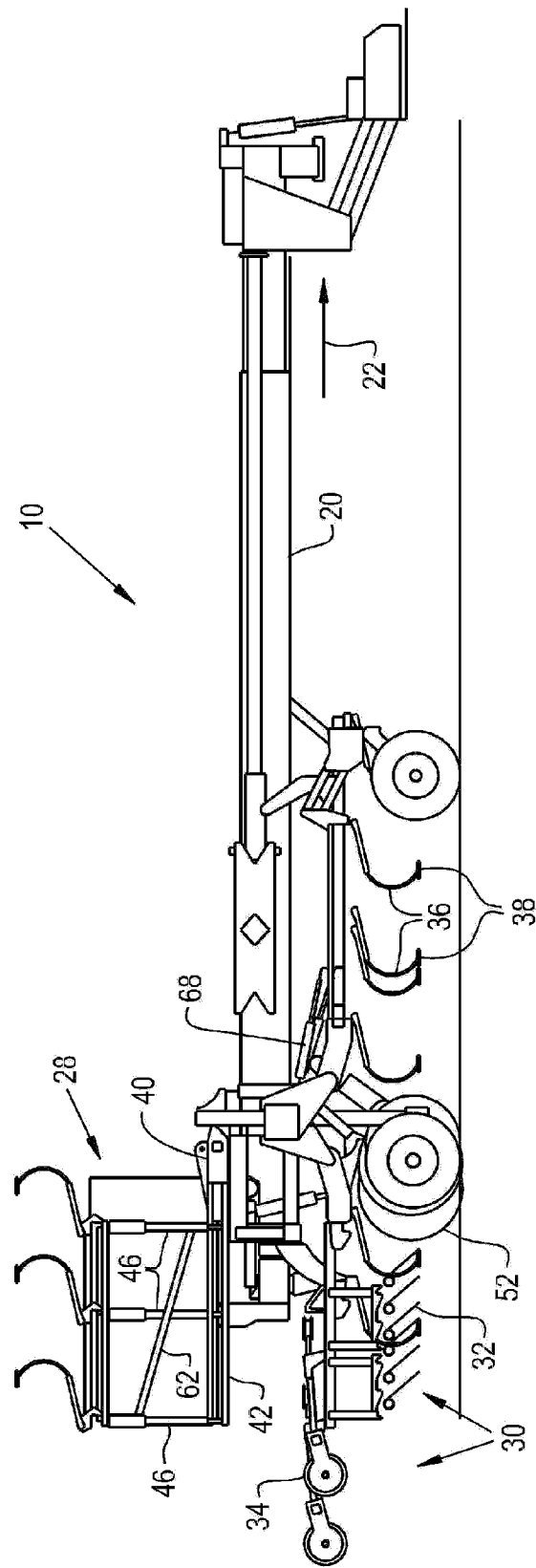
FIG. 4 is a side view of the tillage implement shown in FIGS. 1-3, with the center shank frame in the transport position.
Figure 5:
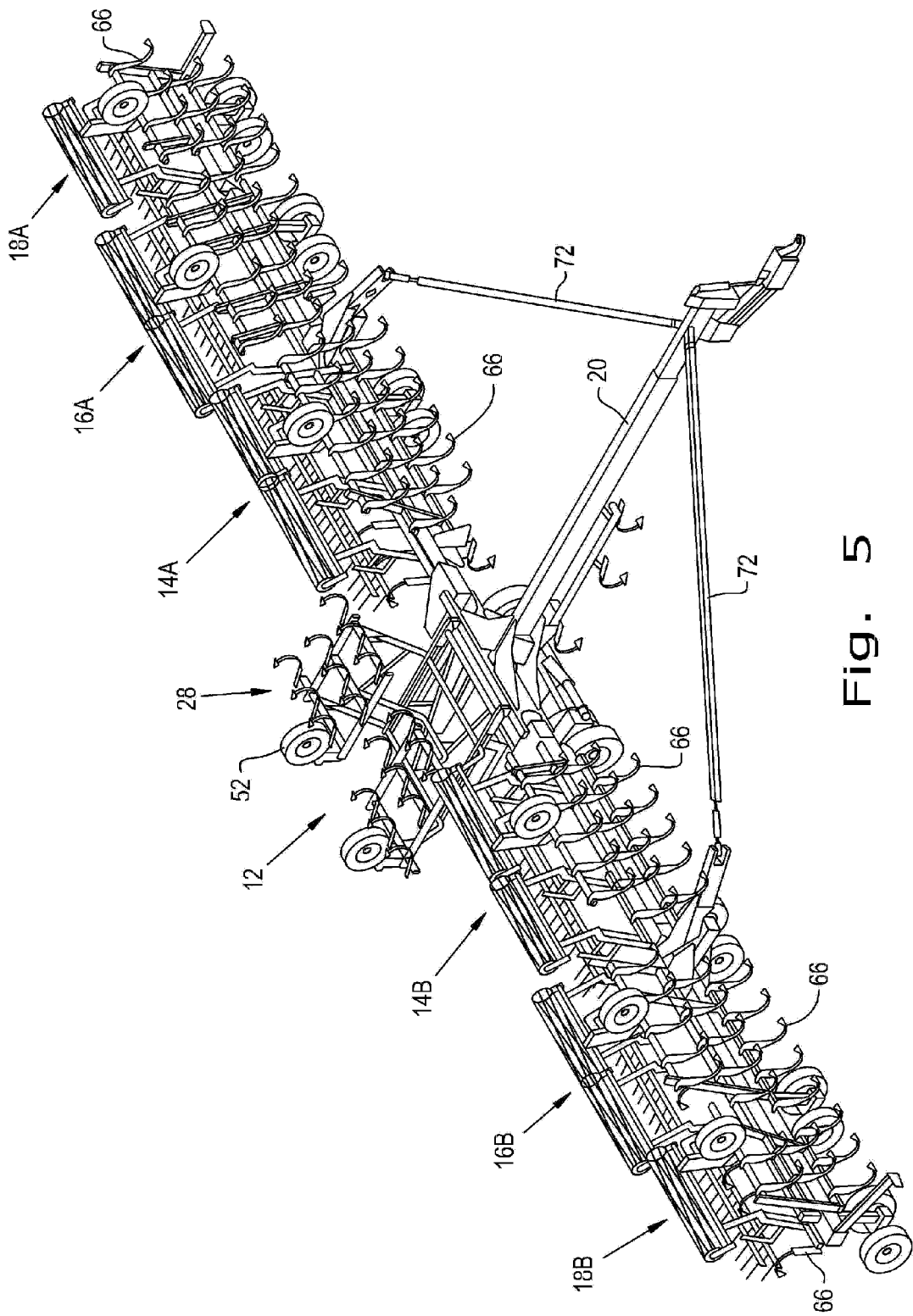
FIG. 5 is a top perspective view of the tillage implement shown in FIGS. 1-4, with the center shank frame folded rearward to a transport position and the wing section shank frames folded upwards to a transport position.

Shank frame 28 generally functions to carry cultivator shanks 36 with shovels 38 at their lower ends for tilling the soil. Shank frame 28 is pivotally coupled with tool bar 24, preferably at the top of tool bar 24, such as with couplings 40. Shank frame 28 is positioned in front of the tool bar 24 when in an operating position (FIGS. 1 and 3), and is foldable up and over the tool bar 24 to a position rearward of tool bar 24 when in a transport position (FIGS. 2 and 4). Shank frame 28 includes two sets of longitudinal frame members 42 which are pivotally coupled with tool bar 24 at one end thereof using couplings 40. A plurality of cross frame members 44 are coupled with the longitudinal frame members 42. Each of the cross frame members 44 have a pair of opposite outboard ends 46 which extend horizontally past longitudinal frame members 42, then in a downwardly angled direction, whereby the outboard ends 46 are positioned on opposite lateral sides of the pull hitch tube 20 when in an operating position. The outboard ends 46 of cross frame members 44 are coupled with a pair of respective shank sub-frames 48. Shank sub-frames 48 are spaced apart from each other in a direction transverse to pull hitch tube 20 and are positioned on respective opposite lateral sides of pull hitch tube 20 when in an operating position.

A center shank sub-frame 50 is attached to and positioned below pull hitch tube 20. Since shank sub-frames 48 are spaced apart on either side of pull hitch tube 20, center shank sub-frame 50 functions to till the soil in the intermediate open space between the two shank sub-frames 48. Center shank sub-frame 50 includes a number of cultivator shanks and corresponding shovels; three in the illustrated embodiment. Center shank sub-frame 50 is raised up and down with the raising and lowering of rear lift wheels 52 using hydraulic cylinder 54.

Shank frame 28 also includes one or more gauge wheel assemblies 56 which function to level shank sub-frames 48. In the illustrated embodiment, shank frame 28 includes two gauge wheel assemblies 56 which are respectively coupled with a front of a respective shank sub-frame 48. A hydraulic cylinder 58 is used to fold shank frame 28 from the operating position to the transport position, and vice versa. Hydraulic cylinder 58 may optionally be placed in a "float mode" such that gauge wheel assemblies 56 are operable to float up and down as they traverse across a field and thereby set the operating depth at the front edge of shank frame 28.

Shank frame 28 may also include additional support frame members 60 and 62 which provide structural rigidity. Support frame members 60 extend diagonally across the top of shank frame 28, and support frame members 62 extend diagonally between the outboard ends 46 of cross frame members 44.

Figure 6:
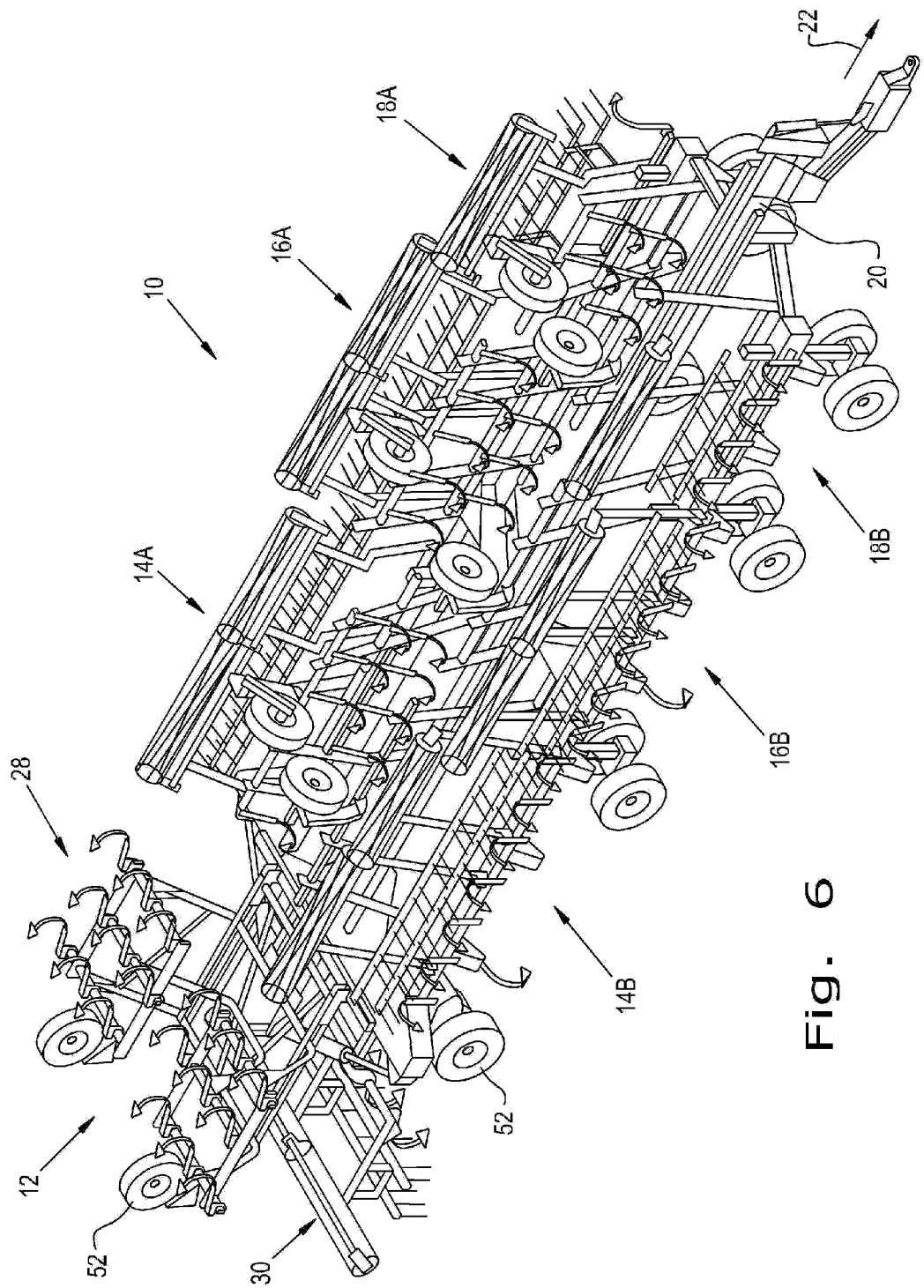
FIG. 6 is a top perspective view of the tillage implement shown in FIGS. 1-5, with the wing sections folded forward to a transport position.

During use, it is periodically necessary to move the field cultivator 10 from an unfolded (operating) position to a folded (transport) position. Hydraulic cylinder 54 is first actuated to lift the rear lift wheels 52 to the raised transport position. Hydraulic cylinder 58 is then actuated to fold shank frame 28 up and over tool bar 24 to an inverted position rearward of tool bar 24 (FIGS. 2 and 4). Then the shank sections 66 of the wing sections 14, 16 and 18 are folded upwards to a position at or near vertical using hydraulic cylinders 68 (FIGS. 1, 2 and 4). Diagonally angled draft arms 72 extending between a forward end of pull hitch tube 20 and a respective tool bar 24 associated with the pair of middle wing sections 16A and 16B are then folded inward, and wing sections 14, 16 and 18 are then folded forward to a position adjacent pull hitch tube 20 (FIG. 6). Gauge wheel assemblies 56 at the front of center shank frame 28 and gauge wheel assemblies 70 at the front of wing sections 14, 16 and 18 are all configured as caster wheels and are not in contact with the ground when field cultivator 10 is in the folded or transport state. For unfolding the field cultivator 10 to the operating position, the reverse folding sequence is carried out.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
    a main frame section including a pull hitch tube extending in a travel direction, and a tool bar coupled with and extending transverse to said pull hitch tube;
    a shank frame pivotally coupled with said tool bar, said shank frame being positioned in front of said tool bar when in an operating position, and foldable up and over said tool bar to a position rearward of said tool bar when in a transport position;

a center shank sub-frame attached to and positioned below said pull hitch tube, wherein said shank frame includes a pair of longitudinal frame members pivotally coupled with said tool bar at one end thereof, and a plurality of cross frame members coupled with said longitudinal frame members, each of said cross frame members having a pair of opposite outboard ends which extend past said longitudinal frame members in a generally downward direction whereby said outboard ends are positioned on opposite lateral sides of said pull hitch tube, wherein said outboard ends of said cross frame members are coupled with a pair of respective shank sub-frames, each said shank sub-frame being positioned on a respective opposite said lateral side of said pull hitch tube.

2. The agricultural tillage implement of claim 1, wherein said shank frame is pivotally coupled with a top of said tool bar.

3. The agricultural tillage implement of claim 1, further including at least one gauge wheel assembly, each said gauge wheel assembly being coupled with a front of said shank frame.

4. The agricultural tillage implement of claim 1, further including a plurality of wing sections, at least one said wing section positioned adjacent to one side of said main frame section, and at least one other said wing section positioned adjacent to an opposite side of said main frame section.

5. The agricultural tillage implement of claim 4, wherein said plurality of wing sections includes three said wing sections positioned adjacent to said one side of said main frame section, and three said wing sections positioned adjacent to said opposite side of said main frame section.

6. The agricultural tillage implement of claim 4, wherein said wing sections include shank sections that are foldable vertically upwards, and then said wing sections are foldable in a forward direction to a transport position adjacent said pull hitch tube, after said shank frame associated with said main frame section is folded to said position rearward of said tool bar.

7. The agricultural tillage implement of claim 1, wherein said agricultural tillage implement is a field cultivator.

8. A shank frame for an agricultural field cultivator including a main frame section having a pull hitch tube extending in a travel direction, and a tool bar coupled with and extending transverse to the pull hitch tube, said shank frame comprising:

a plurality of longitudinal frame members configured for pivotal coupling with the tool bar at one end thereof, whereby said shank frame is positionable in front of the tool bar when in an operating position, and foldable up and over the tool bar to a position rearward of the tool bar when in a transport position;

a plurality of cross frame members coupled with said longitudinal frame members, each of said cross frame members having a pair of opposite outboard ends which extend past said longitudinal frame members in a generally downward direction whereby said outboard ends are positioned on opposite lateral sides of said pull hitch tube; and a pair of shank sub-frames respectively coupled to said opposite outboard ends of said cross frame members, each said shank sub-frame being connected with a plurality of cultivator shanks, said shank sub-frames being spaced apart from each other in a direction transverse to the travel direction and being positioned on a respective opposite said lateral side of said pull hitch tube.

9. The shank frame of claim 8, further including at least one gauge wheel assembly, each said gauge wheel assembly being coupled with a front of said shank frame.

* * * * *